United States Patent [19]

Kato

[11] Patent Number: 4,786,916

[45] Date of Patent: Nov. 22, 1988

[54] THERMAL HEAD

[75] Inventor: Masakazu Kato, Furukawa, Japan

[73] Assignee: Alps Electric Co., Ltd., Japan

[21] Appl. No.: 936,795

[22] Filed: Dec. 2, 1986

[30] Foreign Application Priority Data

Dec. 25, 1985 [JP] Japan ............................... 60-297083

[51] Int. Cl.[4] ..................... G01D 15/10; H01C 1/012; B05D 5/12; B32B 15/06

[52] U.S. Cl. ............................... 346/76 PH; 219/216; 338/308; 427/103; 427/402; 428/627; 428/615; 428/621; 428/629

[58] Field of Search .................... 346/76 PH; 219/216; 400/120; 338/308; 427/58, 96, 103, 402, 311, 315, 325; 428/615, 621, 627, 629

[56] References Cited

U.S. PATENT DOCUMENTS 4,612,433 9/1986 Nagaoka et al. .................... 219/216
4,617,575 10/1986 Fuyama et al. ................ 346/76 PH

FOREIGN PATENT DOCUMENTS 56-30875 3/1981 Japan .................................. 400/120

OTHER PUBLICATIONS

Hewlett-Packard Co. Abstract, Sep. 1980, "A High Speed, High Performance, Scanning Thin Film Thermal Printhead", pp. 122-127, Kanazawa, Gilbert and Trueba.

*Primary Examiner*—E. A. Goldberg
*Assistant Examiner*—Gerald E. Preston
*Attorney, Agent, or Firm*—Guy W. Shoup; Paul J. Winters

[57] ABSTRACT

A thermal head in which a glazed layer, an improved undercoat layer, a heat generating resistor layer, an electrical power supply conductor layer and a protection layer are successively laminated to the surface of an insulating substrate, in which the undercoat layer is composed of an aluminum nitride (AlN) film. The method of manufacturing the thermal head comprises forming the aluminum nitride (AlN) film by sputtering an Al target in a gas mixture of argon and nitrogen and forming the heat generating resistor layer and the electrical power supply conductor layer, that is, three layers in total successively formed by sputtering. Because of the good heat conductivity of aluminum nitride film, the temperature distribution in the heat generating portion is made uniform and localized heat generation can be avoided, as it also prevents the destruction of the heat generating resistor layer or the protection layer due to the temperature difference upon heat generation. The temperature distribution in the heat generating portion is made uniform to eliminate the heat generation dots destructed at an applied low electric power, thereby significantly improving the reliability of the thermal head. Further, by the method of manufacturing the thermal head according to this invention, the continuity between each of the layers is favorable and a thermal head of a high reliability can be obtained.

2 Claims, 2 Drawing Sheets

FIG. 3(a)
FIG. 3(b)
FIG. 3(c)
PRIOR ART
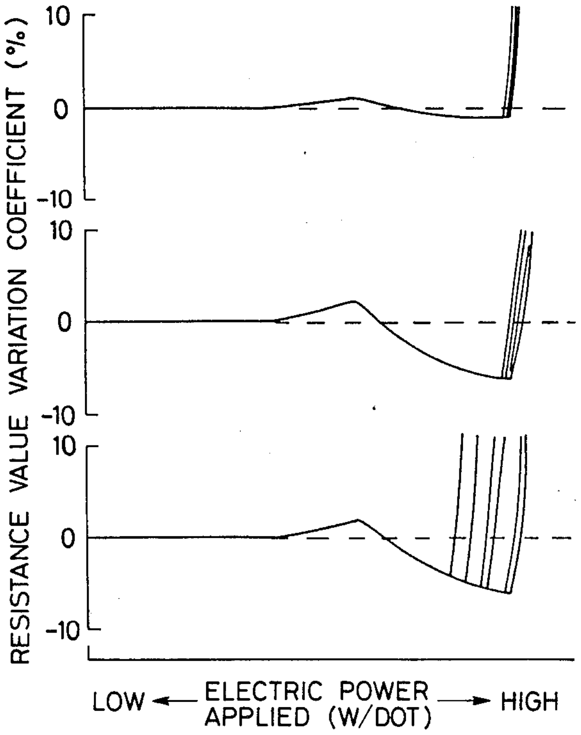
FIG. 4(a)
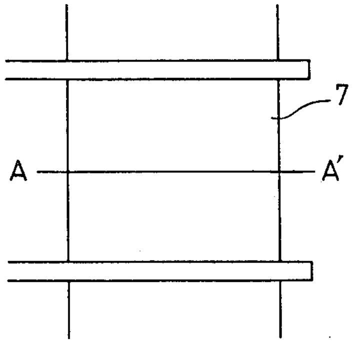
FIG. 4(b)
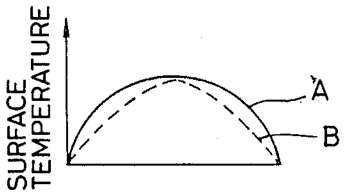

THERMAL HEAD

BACKGROUND OF THE INVENTION

1. Field of the Invention

This invention relates to a thermal head for use in a heat sensitive type printer or heat transfer type printer, as well as to a method of manufacturing the same. More specifically, this invention concerns an improvement in the undercoat layer 2. Description of the Prior Art The conventional thermal head has a cross sectional structure, for example, as shown in FIG. 2 prepared by using a partially glazed substrate in which a glazed layer 2 is partially formed on the surface of an insulating substrate 1 such as made of alumina and by laminating thereover an undercoat layer 3' such as made of a $Ta_2O_5$ film, a heat generating resistor layer 4 such as made of a $Ta_2N$ or Ta-W-N film, an electric power supply conductor layer 5 such as made of an Al film and a protection layer 6 such as made of a dual layer film composed of a lower $SiO_2$ layer film and an upper $Ta_2O_5$ layer film successively. A part of the heat generating portion 7 generates heat to provide heat energy for developing color on heat sensitive paper 8 or the like in contact therewith.

In this case, the undercoat layer 3' is inserted with an aim of preventing the glazed layer 2 from being etched simultaneously upon etching the heat generating resistor layer 4 formed just above. That is, it is necessary to use a mixture of fluoric acid and nitric acid as a etchant for etching the heat generating resistor layer 4 composed, for example, of a $Ta_2N$ or Ta-W-N film to form a pattern. Since the etchant rapidly erodes the glazes layer 2 made of glass, peeling is resulted to the heat generating resistor film at the edged portion of the heat generating resistor pattern to cause the abnormality in the pattern configuration. A thermal head having the heat generating resistor pattern of such an abnormal shape involves a problem such as increase in the resistance value and shortening in the heat generating life. Then, for overcoming the problem, a film less sensitive to the etchant is formed as the undercoat layer 3' over the glazed layer 2 thereby protecting the layer 2. As the material for the undercoat layer 3', a $Ta_2O_5$ film with an extremely low etching tendency to the fluoro-nitric acid has usually been employed.

However, the conventional thermal head comprising the undercoat layer 3' composed of the $Ta_2O_5$ has various problems as described below.

FIG. 3(*c*) shows the result of the step-stress test (SST) for the conventional thermal head as described above. In this case, SST is a sort of acceleration tests for evaluating the heat-resistant stability of the thermal head, in which an appropriate pulse voltage is applied for a predetermined of time to the heat generating resistor body to measure the variation relative to the initial resistance value and the variation coefficient for the resistance value in each of the steps is plotted while gradually increasing the application voltage till the heat generating resistor body is burnt to be disconnected. If the variation coefficient for the resistance value increases in excess of 20%, the heat generating resistor body is judged to be destructed.

Now, FIG. 3(*b*) shows the result of the SST for the conventional thermal head having a plurality of heat generating portion (dots). As can be seen from the figure, destruction already appears at a relatively low electric power applied and there is a drawback that the destruction voltage varies depending on the dots. Generation of dots destructed at such a low electric power applied significantly degrades the reliability of the thermal head to result in a significant problem.

SUMMARY OF THE INVENTION

In view of the foregoing problems, the object of this invention is to provide a thermal head of a high reliability not generating dots destructed by a low electric power applied.

The foregoing object of this invention can be attained by a thermal head in which a glazed layer, an undercoat layer, an electric power supply conductor layer and a protection layer are successively laminated to the surface of an insulating substrate, in which the undercoat layer is composed of an aluminum nitride (AlN) film.

The thermal head of this invention in which a glazed layer, an undercoat layer, a heat generating resistor layer, an electric power supply conductor layer and a protection layer are successively laminated to the surface of an insulating substrate is manufactured by a method which comprises forming the glazed layer on the insulating substrate, thereafter, forming the undercoat layer composed of an aluminum nitride (AlN) film by sputtering an Al target in a gas mixture of argon and nitrogen and forming the heat generating resistor layer and the electric power supply conductor layer by three layers in total successively by sputtering.

According to the thermal head of this invention, since the undercoat layer is constituted with an aluminum nitride film of a good heat conductivity, the temperature distribution in the heat generating portion is made uniform and localized heat generation can be avoided and destruction of the heat generating resistor layer or the protection layer due to the temperature difference upon heat generation can be prevented, whereby the formation of dots destructed at low electric power applied can be avoided to thereby significantly improve the reliability.

Further, by the method of manufacturing the thermal head according to this invention, since the undercoat layer, the heat generating resistor layer and the electric power supply conductor layer, that is, three layers in total are successively formed by sputtering, the continuity between each of the layers is favorable and a thermal head of a high reliability can be obtained.

BRIEF DESCRIPTION OF THE APPENDED DRAWINGS

These and other objects, features, as well as advantageous effects of this invention will now be described more specifically while referring to preferred embodiments illustrated in the appended drawings, wherein FIG. 1 is a cross sectional view for a portion of one embodiment of the thermal head according to this invention;

FIG. 2 is a cross sectional view for a portion of a conventional thermal head;

FIGS. 3(*a*) and (*b*) are graphs showing the result of the step stress test (SST) for the thermal head according to this invention;

FIG. 3(*c*) is a graph showing the result for the SST test for the conventional thermal head;

FIG. 4(*a*) is a plan view near the heat generating portion of the thermal head; and FIG. 4(*b*) is a graph showing the temperature distribution in the heat generating portion taken along line A–A' in FIG. 4(*a*).

DESCRIPTION OF THE PREFERRED EMBODIMENT

Figure 1:
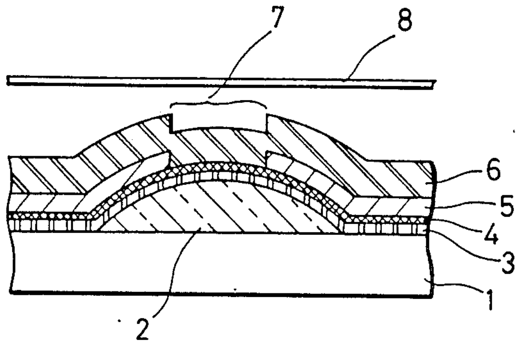

FIG. 1 shows a cross sectional structure for one embodiment of the thermal head according to this invention. Since the constitution for each of the layers is identical with that in the conventional embodiment (refer to FIG. 2) excepting that the undercoat layer 3 is constituted with an aluminum nitride (AlN) film, the explanations therefor are omitted. A dual layer film prepared by forming a TaOx film ($x<2.5$; film thickness of about 5 μm) formed on a $SiO_2$ (film thickness of about 2 μm) is used as the protection layer 6.

The method of manufacturing the thermal head will now be explained. A partially glazed substrate prepared by partially forming a glaze layer 2 on the surface of an insulating substrate 1 made of aluminum was cleaned by an ordinary method and then mounted to the inside of a sputter film-forming device. At least two targets made of Al and Ta are contained to the inside of the sputter film-forming device. Further, an appropriate amount of W pellet is placed on the Ta target for forming the heat generating resistor film composed of a Ta-W-N film.

The Al target is sputtered at a substrate temperature of about 200° C., in a gas mixture of argon and nitrogen with the argon gas flow rate of 10 SSCM and the nitrogen gas flow rate of 10 SCCM and at an RF electrtic power of 1 KW to form a film of an undercoat layer 3 composed of an aluminum nitride film of about 3000 Å thickness on the substrate. Successively, after interrupting the gas flow and increasing the vacuum degree, the Ta target is sputtered in a gas mixture with the argon gas flow rate of 46 SCCM and the nitrogen gas flow rate of 1.9 SCCM by an RF electric power of 0.5 KW to form a heat generating resistor layer 4 composed of a Ta-W-N film of about 500 Å thickness.

Successively, after interrupting the gas flow and increasing the vacuum degree, as well as controlling the substrate temperature to 110° C., the Al target is sputtered in an argon gas stream at a flow rate of 46 SCCM to form an electric power supply conductor layer 5 made of an Al film of about 1.5 μm thickness.

In this way, after forming three layers, that is, the undercoat layer 3 (aluminum nitride film), the heat generating resistor layer 4 (Ta-W-N) film and the electric power supply conductor layer (5) (Al film) successively on the partially glazed layer 2, the protection layer 6 composed of the two layers are formed by sputtering to obtain the thermal head according to this invention.

Figure 2:
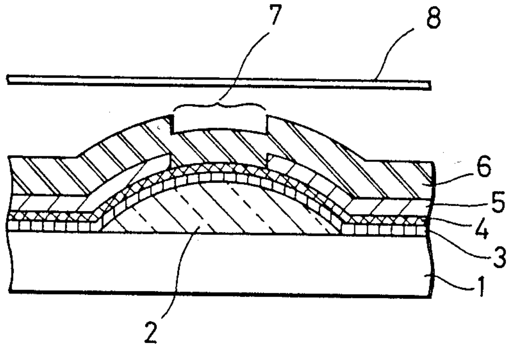
FIG. 2 PRIOR ART

FIG. 3(*a*) shows the result of the SST for the thermal head of the embodiment in which the aluminum nitride film is used as the undercoat layer 3, and the three layers are formed successively as described above. Further, FIG. 3(*b*) shows the result of the SST for the thermal head of another embodiment in which the aluminum nitride film is used as the undercoat layer 3 and the heat generating resistor layer 4 and the electric power supply conductor layer 5 are formed after the formation of the undercoat layer 3 and after once releasing the vacuum. Further, FIG. 3(*c*) shows the result of the SST for the conventional thermal head using the $Ta_2O_5$ film as the undercoat layer 3' as shown in FIG. 2. The thermal heads (a), (b) according to this invention include no such dots as being destructed by the low electric power applied and having higher reliability as compared with the conventional thermal head (c).

FIG. 4(*a*) is a plan view for the vicinity of the heat generating portion 7 of the thermal head. FIG. 4(*b*) shows the result of the measurement for the temperature distribution in the heat generating portion 7 along line A–A' in FIG. 4(*a*). In FIG. 4(*b*), A represents the thermal head according to this invention and B represents the conventional thermal head. In this way, the temperature distribution is made more uniform in the thermal head A according to this invention as compared with that in the conventional thermal head B. Accordingly, the localized heat generation (heat spot) accompanying the rise in the application voltage can be retained in the thermal head according to this invention. As a result, there can be provided an improvement for the defect of the conventional thermal head that the heat generating resistor layer 4 or the protection layer 6 is destructed the difference in the heat expansion coefficient due to the temperature difference upon heat generation. This may be considered attributable to that the heat conductivity of the aluminum nitride film is as high as 16.0W/M.°C.

By the way, it can be seen by the comparison between FIGS. 3(*a*) and (*b*) that the variation of the resistance value is made smaller in the case (a) than in the case (b). It has been confirmed from the results of various tests that the variation in the resistance value by the SST draws a trace substantially similar to the variation in the resistance value by the ordinary printing lift test or pulse life test. Accordingly, reduction in the variation of the resistance value in the SST means that the amount of heat generation of the heat generating dot is constant even actually put under the printing for a long period of time and, accordingly, since the printing density is rendered constant for a long time, a significant effect can be obtained for the improvement in the quality of the printing.

FIGS. 3(*a*) and (*b*) show the result of the test for the embodiment according to this invention using the aluminum nitride film to the undercoat layer respectively, in which a substrate formed with a film of the undercoat layer 3 is once taken out to the external atmosphere and then the heat generating resistor layer 4 and the electric power supply conductor layer 5 are formed in (b), while the undercoat layer 3, the heat generating resistor layer 4 and the electric power supply conductor layer 5 are successively formed into film in (a). Accordingly, although the detailed mechanisms are not still clear at present it may be considered that the embodiment shown in (a) exhibits better characteristics than those in the embodiment (b) perhaps because the interface between the undercoat layer 3 and the heat generating resistor layer 4 is not contaminated with atmospheric air.

Anyway, the method of manufacturing the undercoat layer 3, heat generating resistor layer 4 and the electric power supply conductor layer 5 successively according to this invention can provide not only the improvement in the characrteriastics as described above but also advantageous effect of shortening the production time. In the case of forming a thin film, it takes a considerable period of time for the evacuation and substrate heating after mounting the substrate into the device or the decrease in the substrate temperature after the completion of the film formation. Accordingly, the production time in total can be reduced by forming a plurality of films continuously even if the time required for the film formation is identical. In the manufacturing method according to this invention of forming the three layers continuously, the production time can be shortened by about 35% as compared with other cases. Further, since the aluminum nitride film is used as the undercoat layer 3 according to this invention, the electric power supply conductor layer 5 made of Al film can also be formed by a single target and production is possible even by the sputtering film-forming device capable of having only two targets.

By the way, the thickness of the aluminum nitride film constituting the undercoat layer 3 in this invention is preferably greater than 500 Å and less than 3000 Å. If the film thickness is less than 500 Å, no thin film with a uniform thickness can be obtained readily thus failing to provide a desired sufficient function of protecting the glazed layer from the etchant. While on the other hand, if the film thickness exceeds 5000 Å, the heat-resistance impact shock resistance is significantly reduced to result in many heat generation dots that would be desctructed under printing for a short period of time.

As has been described above, in the thermal head according to this invention, since the aluminum nitride (AlN) film is used as the undercoat layer, heat generation dots that would otherwise be destructed at a low electric power applied are no more resulted to significantly improve the reliability of the thermal head. Further, since the temperature distribution in the heat generation dot portion is made uniform, the printing is made clear. Furthermore, with the method of manufacturing the thermal head according to this invention, the variation in the amount of generated heat is low for a long period of time thus the printing density is made constant thereby enabling to obtain a thermal head with an extremely improved printing quality. Further, the production time can also be shortened due to the continuous film formation. While on the other hand, since both of the undercoat layer and the electric power supply conductor layer can be formed with a single Al target, the sputter film-forming device with less number of targets can be employed. Furthermore, since in expensive Al target can be employed without using expensive target such as Ta or $Ta_2O_5$ as usual, the material cost can also be reduced.

What is claimed is:

1. A thermal head in which a glaze layer, an undercoat layer, a heat generating resistor layer, an electric power supply conductor layer and a protection layer are successively laminated in series on the surface of an insulating substrate, wherein said undercoat layer is made of an aluminum nitride (AlN) film having high bonding strength to the glaze layer and the heat generating resistor layer and a good thermal conductivity characteristic so as to evenly distribute heat generated by said heat generating resistor layer and reduce thermal stress, and wherein said protection layer is made of a silicon dioxide ($SiO_2$) film.

2. A thermal head as defined in claim 1, wherein the film thickness of the alumimum nitride film is set to between 500 Å and 5000 Å.

* * * * *